Figure 4:
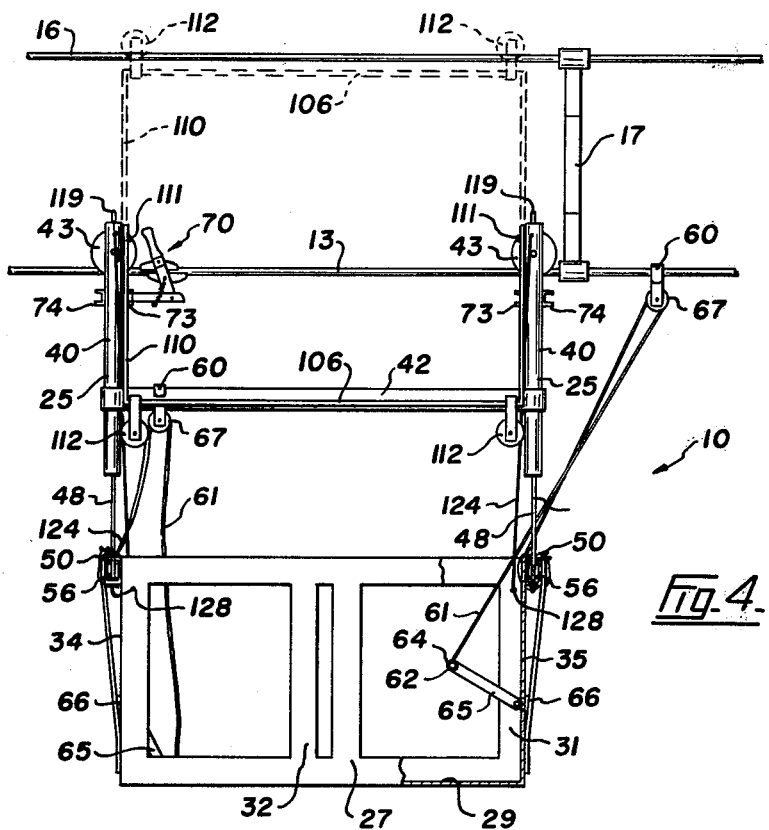

United States Patent [19]

Highland

[11] 4,163,480
[45] Aug. 7, 1979

[54] LINE TRAVELLING SKIPS

[76] Inventor: Stanley E. Highland, 316 Willington Ave., Chilliwack, British Columbia, Canada, V2P 2E4

[21] Appl. No.: 879,035

[22] Filed: Feb. 21, 1978

[51] Int. Cl.$^2$ .................. B61B 7/06; E01B 25/16; E04G 3/10; E04G 3/16

[52] U.S. Cl. .................................... 182/14; 182/36; 182/144; 182/150; 182/193; 104/95; 104/112; 104/122; 105/148; 105/154

[58] Field of Search ............... 182/36, 38, 112, 150, 182/193, 191, 144, 14; 104/89, 95, 112, 113, 114, 115, 106, 107, 109; 105/148, 149, 154, 242

[56] References Cited

U.S. PATENT DOCUMENTS 3,702,124  11/1972  Highland ........................ 104/95

*Primary Examiner*—Francis S. Husar
*Assistant Examiner*—Frank F. Atwood
*Attorney, Agent, or Firm*—Townsend and Townsend

[57] ABSTRACT

A carriage has pulleys adjacent opposite ends thereof for riding on a pair of line cables which have obstructions thereon, such as hangers and spacers. The carriage has brakes associated therewith for engaging the line cables. These brakes are such that they permit the carriage to move in one direction but automatically grip the line cables when the carriage moves in the opposite direction. These brakes are releasable to allow the carriage to be moved in either direction. Lifting apparatus is provided for each end of the carriage in the form of hooks that can be placed on the line cables and lifter lines extending between the hooks and the carriage. The lifter cables are connected to a foot pedal in the carriage which can be manipulated to transfer the weight of the adjacent end of the carriage through the hooks to the line cables thereby allowing the pulleys at that end of the carriage to be lifted off the line cables and shifted around an obstruction thereon.

34 Claims, 8 Drawing Figures

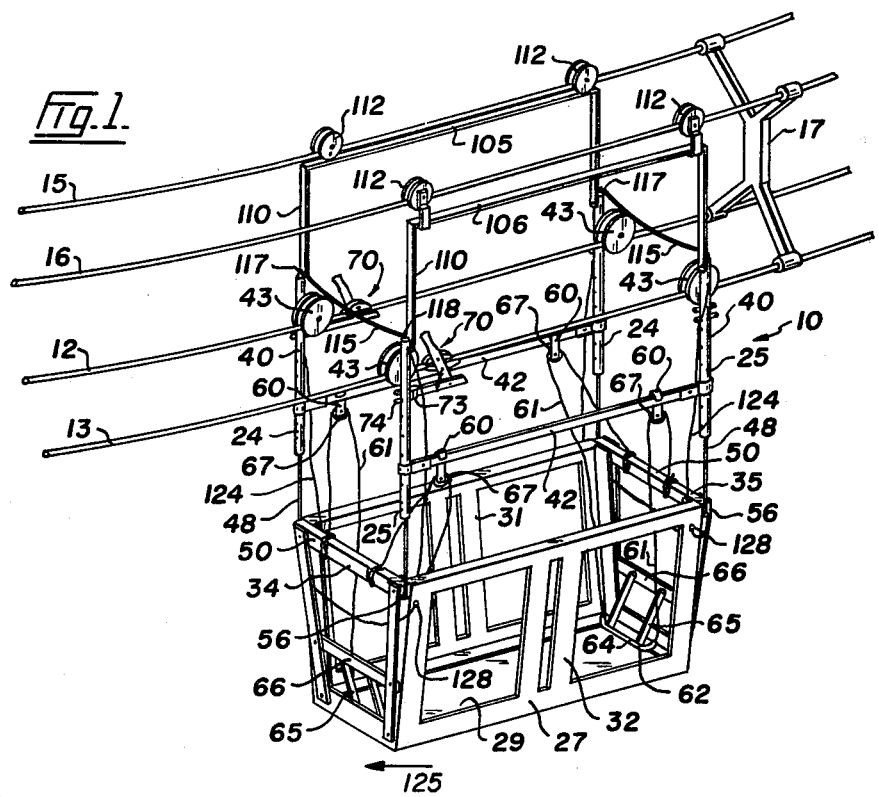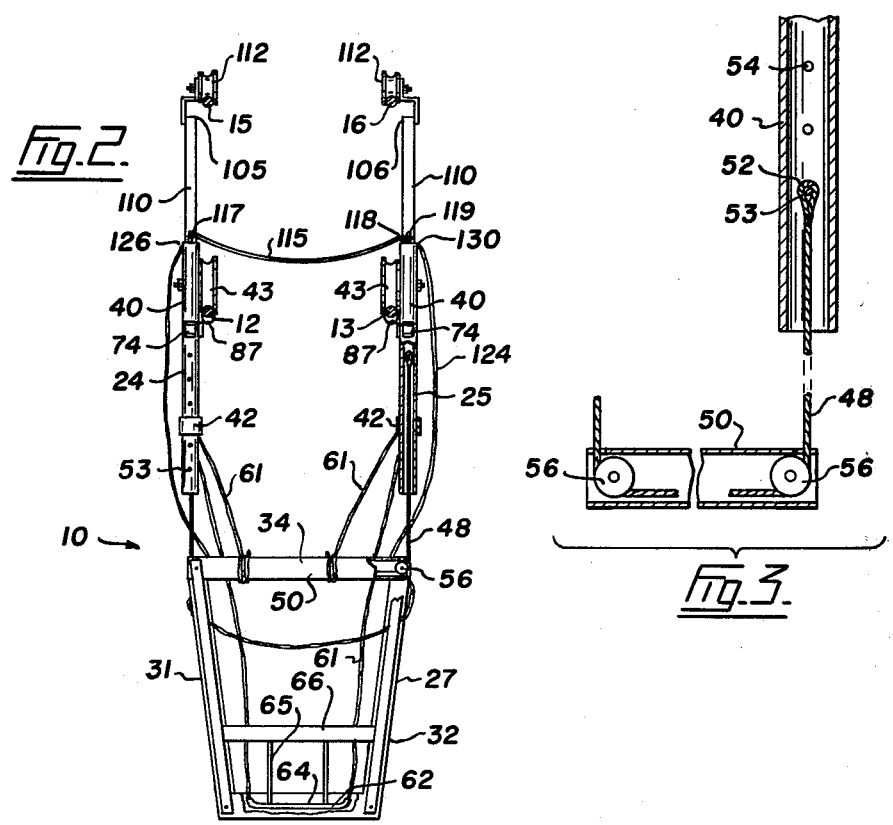

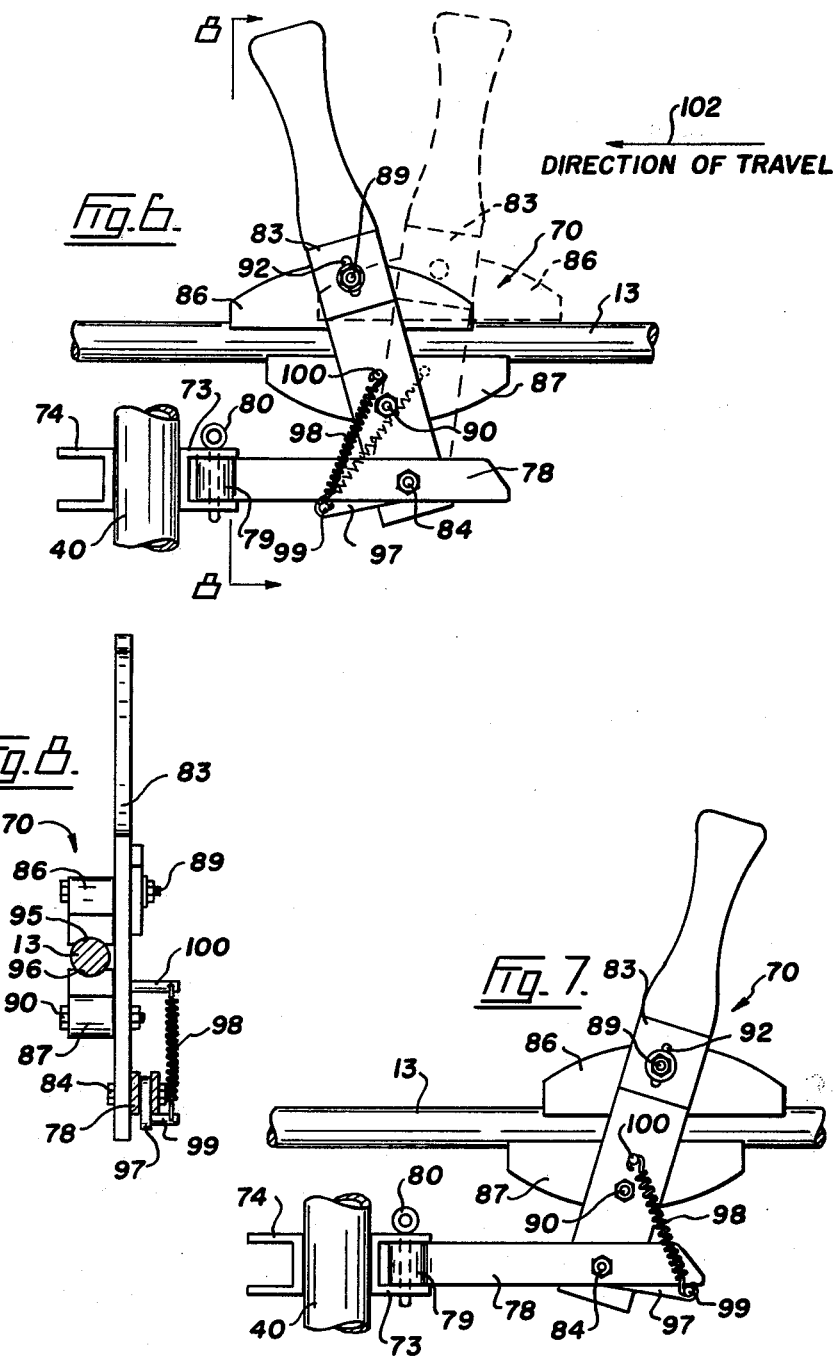

LINE TRAVELLING SKIPS

This invention relates to skips for travelling along line cables, such as electricity transmission lines.

The present skip is an improvement over the skips illustrated in applicant's U.S. Pat. No. 3,702,124 dated Nov. 7, 1972. Although the patented skip is quite satisfactory, it is difficult for a man carried thereby to manoeuver the skip past the usual obstructions of the line cables along which the skip is moved. The present skip is such that it can be made lighter in construction than previous skips and it can be easily manoeuvered past line hardware. It also has an improved brake system for gripping cables, this brake system being such that it automatically releases the cables when the skip is moved in a desired direction, and automatically grips the cables when the skip moves in the opposite direction. The brakes can be manipulated by the operator to control the speed of the skip downhill on the line cables.

An important feature of this invention is an arrangement which enables the pulleys of the skip riding on the line cables to be lifted off these cables in succession and shifted around an obstruction on the cables and then replaced thereon. This arrangement is operated by the operator's foot, leaving his hands free to shift the pulleys along the line cables. In addition, the automatic brakes prevent the skip from running downhill while this is taking place.

Figure 5:
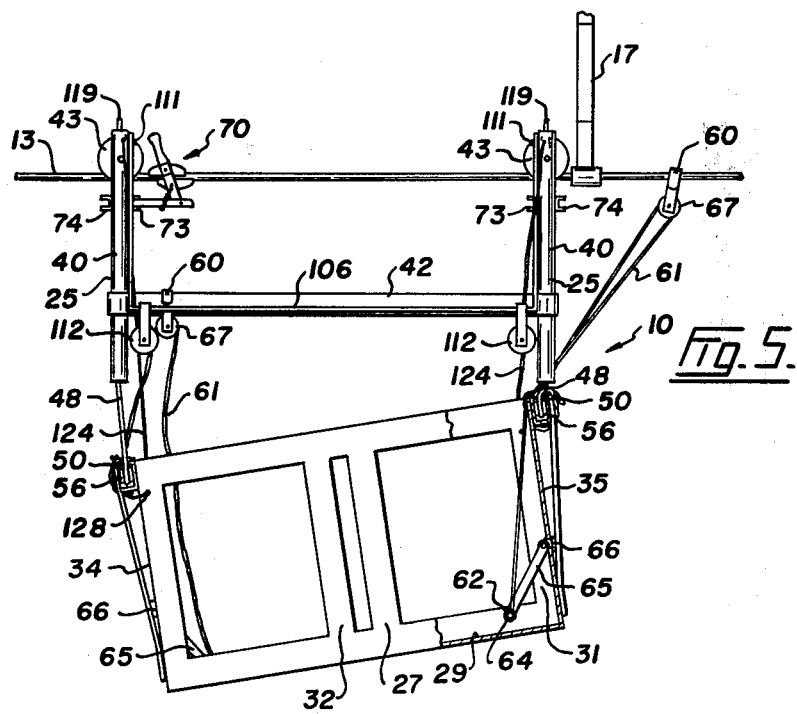

A preferred form of the invention is illustrated by way of example in the accompany drawings, in which:

FIG. 1 is a perspective view of a line travelling skip in accordance with this invention operatively mounted on line cables or conductors, FIG. 2 is an end elevation of the skip, partly in section, FIG. 3 is an enlarged sectional and fragmentary detail of the skip, FIG. 4 is a side elevation of the skip with the shifting means at one end thereof engaging the line cables ready to be operated to enable skip pulleys at that end to be shifted around a line support or spacer, FIG. 5 is a view similar to FIG. 4, but showing the weight of the end of the skip carriage being supported by the line cables, FIG. 6 is an enlarged elevation of a brake of the skip set to allow the skip to move in one direction and stop movement in the opposite direction, FIG. 7 is a view similar to FIG. 6, but showing the brake set to allow the skip to move in the opposite direction, and FIG. 8 is a vertical section taken on the line 8—8 of FIG. 6, showing the brake in end elevation.

Referring to the drawings, 10 is a line travelling skip in accordance with this invention mounted on a pair of laterally spaced line cables 12 and 13. Line cables that form part of an electricity transmission system often are arranged in groups of four, and so another pair of laterally spaced line cables 15 and 16 are positioned above cables 12 and 13, respectively. In the illustrated example, these line cables are retained in their proper positions relative to each other by a standard line spacer 17, which constitutes an obstruction to the travel on skip 10 along the line cables.

Skip 10 is made up of supporting means in the form of identical laterally spaced side members 24 and 25, and a carriage 27 suspended therefrom. Carriage 27 can be of any desired construction but preferably is made as light in weight as possible. In this example, the carriage has a bottom or floor 29, opposed side walls 31 and 32, and end walls 34 and 35. The side and end walls have large openings therein in order to reduce the weight of the carriage.

Each of the side members 24 and 25 includes vertical tubular supports 40 carrying pulleys 43 near their upper ends. A longitudinal bar 42 extends between and is connected at opposite ends to the two supports 40 of each of the side members 24 and 25. Pulleys 43 are carried by supports 40 near the upper ends thereof. These pulleys preferably being on the inner sides of their respective supports. Pulleys 43 of side member 24 ride on line cable 12 while the pulleys of side member 25 ride on line cable 13.

Connecting means is provided for interconnecting carriage 27 and the side members 24 and 25 at the opposite ends of the skip. In this example, there is a suspension cable 48 at each end of the skip extending from within support 40 of member 24 downwardly and then laterally through a tubular bar 50 which forms the upper edge of the adjacent end wall of the carriage. This suspension cable emerges from the opposite end of bar 50 and extends up to and into the support 40 of side member 25. The ends of cable 48 are adjustable connected to the respective supports 40 in any desired manner. In this example, each end of the suspension cable is formed with a loop 52 thereon, see FIG. 3, and a pin 53 extends through a pair of opposed holes 54 which are part of a series of holes in the respective support. By shifting one or both ends of cable 48 up or down in its respective support 40, the effective length of the suspension cable between the supports and carriage is lessened or lengthened to raise or lower the carriage relative to the supports and, therefore, to the line cables. This enables the level of the carriage to be adjusted relative to the lines cables to enable the operator standing in the carriage to conveniently grasp and work on the line cables. If desired, rollers 56 may be provided at opposite ends of each tubular bar 50 so that the cable 48 extending through said bar can extend around these rollers, see FIG. 3. With the arrangement just described, the ends of carriage 27 are supported by line cables or conductors 12 and 13 through pulleys 43, supports 40, suspension cables 48 and carriage end bars 50.

Suitable lifting means is provided at each end of the carriage to support said end from the line cables while the adjacent pulleys 43 are lifted off the line cables and shifted around an obstruction thereon, such as spacer 17. The lifting means at each end of the carriage include cable engager means to be placed on the line cables, extensible connector means connected to and extending between the cable engage means and the carriage, and control means manipulatable by the operator in the carriage selectively to shorten and lengthen this connector means temporarily to take the weight of the carriage off the adjacent pulleys that are to be lifted off the line cables and shifted around the obstruction.

In this example the cable engaging means comprise a pair of hooks 60, the extensible connector means is a pair of lifter cables 61, and the control means is in the form of a foot pedal 62 mounted on the carriage. This foot pedal is made up of a horizontal bar 64 having a pair of links 65 projecting therefrom, the opposite ends of these links being swingably connected to a cross brace 66 spaced above the carriage floor 29 and forming part of the adjacent end wall of the carriage. A pulley 67 is carried by each hook 60, and each lifter cable 61 is connected at one end to pedal 62, extends upwardly and around a pulley 67 and back down to the bar 50 of the adjacent end of the carriage, said cable being secured to the bar. When the hooks are on the line cables, one being shown in FIG. 4, pedal 62 is inclined upwardly and inwardly of the carriage. When the pedal is depressed, the adjacent end of the carriage is raised, as shown in FIG. 5, so that the weight of this carriage end is carried by the line cables through the hooks thereon. At this time the adjacent pulleys 43 can be lifted off the line cables and spread laterally apart. The carriage can now be moved forwardly so that the pulleys can be put back on the line cables on the opposite side of the obstruction or spacer 17. Release of the foot pedal allows the carriage end to drop back to its proper position.

Skip 10 is provided with one or more brakes 70. FIG. 1 shows a pair of these brakes at one end of the skip, one on each of the line cables 12 and 13, but there can be another pair of the opposite end of the skip,. Furthermore, the two brakes 70 are shown inside the skip in FIG. 1, but they can extend in th opposite direction on the opposite side of the pulleys at this end of the skip.

Each of the vertical supports 40 has brackets 73 and 74 projecting inwardly and outwardly therefrom adjacent its upper end. Brake 70 includes an arm 78 having a loop 79 at an end thereof adapted to fit into one of the brackets 73 or 74, it being shown in bracket 73 in FIGS. 6 and 7, and a pin 80 extends downwardly through the bracket and through this loop releasably to retain arm 78 in its normal horizontal position. The pin also allows the arm to be swung in a horizontal plane relative to its support 40.

The brake 70 includes a lever 83 swingably mounted at its lower end on a pivot pin 84 carried by arm 78. A pair of brake shoes 86 and 87 are swingably connected to lever 83 above and below the adjacent line cable 13 by pins 89 and 90. The pin 89 of the upper shoe 86 extends through a slot 92 in the brake lever so that said upper shoe can be adjusted substantially vertically in order to accommodate line cables of different diameters between the two brake shoes. Shoes 86 and 87 are provided with grooves 95 and 96 in their inner facing surfaces so as to fit around the line conductor, as shown in FIG. 8. A short toggle link 97 is swingably mounted on pivot pin 84 and is inclined downwardly therefrom. A spring 98 is connected at one end of the outer ends of toggle link 97 by a pin 99, and the opposite ends of said spring is connected to lever 83 by a pin 100, said pin being spaced above pivot pin 84 on the longitudinal center line of the lever which passes through both of these pins. When link 97 is in the position shown in FIG. 6, lever 83 is in an inclined position to one side of pin 84, and when link 97 is swung over to the otherside of pin 84, as in FIG. 7, lever 83 moves into an inclined position on the opposite side of pin 84. When the brake lever is in the position shown in FIG. 6, movement of the skip in the direction indicated by arrow 102, results in the lever tending to straingthen up so that brake shoes 86 and 87 are free to move along the line cables. On the other hand, if the skip moves in the opposite direction, the lever swings back to cause the brake shoes to grip the line cable. In order to free the brake shoes from the cable to allow the skip to move in this opposite direction, lever 83 is swung by the operator into a substantially vertical position so that the brake shoes can move along the line cable. The operator can regulate the speed of the skip by manipulating the brake lever between its vertical and inclined positions.

The skip 10 described so far can travel along the lower lines cable 12 and 13. The weight of the skip and the operator in it will tend to pull these lower line cables away from the upper cables 15 and 16. The skip can be provided with means for preventing this separation of the cables. In the illustrated example, the skip is provided with side frames 105 and 106 of substantially inverted U formation and having arms 110 inclined downwardly with lower ends connected to the upper ends of supports 40 of side members 24 and 25 respectively, by pivot pins 111. Each of these side frames carries one or more pulleys 112 which are positioned to ride on the upper line cables 15 and 16.

When it is desired to retain the lower line cables 12 and 13 and upper line cables 15 and 16 in their proper positions relative to each other at skip 10, pulleys 112 ride on the upper line cables, as shown in FIGS. 1 and 2. If there are no upper line cables or it does not matter where they are relative to the skip, or if the skip is to be moved around the spacer 17, pulleys 112 are lifted off the upper line cables and side frames 105 and 106 are allowed to swing downwardly against the longitudinal bars 42 of side members 24 and 25, as shown in FIGS. 4 and 5.

Skip 10 is provided with a safety cable at each end thereof. In this example, a safety cable 115 extends between the laterally spaced supports 40 of side members 24 and 25 at each end of the skip. Each cable 115 is fixedly connected at 117 to the upper end of one support 40, and is releasably connected to the upper end of the opposite support 40 by suitable means, such a snap hook 118 secured to the end of the cable and an eye or loop 119 fixed to the upper end of the adjacent vertical support. The safety cables 115 extend between side members 24 and 25 above the line cables 12 and 13 so that if any of the pulleys 43 come off the line cables, the skip will not drop to the ground. In addition, when the skip reaches an obstacle such as spacer 17, one end of the adjacent safety cable 115 is released from its vertical support so that the safety cable can be moved around to the opposite side of the obstacle and then connected back to its vertical support. Thus, the safety cable extends over the line conductors at the time the pulleys are lifted off the line cables and shifted around the obstacle.

If desired, another safety cable 124 can be provided at each end of skip 10. Referring to the safety cable at the left hand of FIG. 1 and shown in FIG. 2, one end of this cable is secured at 126 to the upper end of support 40 of side member 24 in any suitable manner, such as by welding, and the cable extends downwardly outside the side member and then into carriage 27 whence it passes through a hole (not shown) in the side wall 31 of the carriage. This safety cable then extends across the end of said carriage and back through a hole 128 in side wall 32, and upwardly outside side member 25 to its end fixedly secured at 130 to the upper end of support 40 of the latter side member. With this arrangement, should suspension cable 48 break, safety cable 124 will prevent the adjacent end of the carriage from dropping downwardly.

The operation and manipulation of skip 10 is obvious from the above description. The pulleys 43 are placed on line conductors 12 and 13 with carriage 27 suspended therebelow. If there are upper line cables 15 and 16 present, and if it is desired to retain them within working distance of the carriage, pulleys 112 are placed on the upper line cables. Carriage 27 is large enough to hold one or more workers. The position of the carriage relative to the line cables is adjusted by means of suspension cables 48 to enable the operator to grasp and work on these cables. Whenever adjustment is necessary, the pin 53 at one end of each cable 48 is removed and the effective length of the suspension cable between the side member and the carriage is adjusted, and then the pin 53 is reinserted in the appropriate holes 54 of the support 40 and through the loop 52 at the cable end. If more adjustment is required, this operation can be repeated at the opposite end of each suspension cable.

The operator then locates one or more brakes 70 on the line 12 and 13 in the position he finds most convenient. There are usually a pair of these brakes, and these are usually located at the front end of the skip with reference to the direction of movement thereof at the time. FIG. 1 shows a pair of brakes 70 located at the front end of the skip, the direction of movement of the skip being indicated by arrow 125. At this time, the brake levers 83 are inclined forwardly, as shown in FIGS. 1 and 6. As is well know, transmission cables hang in catenaries between towers. As this skip leaves a tower, it travels downhill roughly half way to the next tower. During this time, the brakes do not grip the line cables, and the operator can when desired manipulate the brake levers 83 to cause the brake shoes 86 and 87 to grip the lines or conductors. The operator swings the brakes levers forwardly if he wants to slow down or stop the skip. When the skip reaches the uphill part of the cables, the operator has to grab these line cables and pull the skip therealong. As he pulls the skip forwardly in the direction of arrow 102 in FIG. 6, the brakes automatically slide along the cables. When he releases the cables in order to reach forward to grab them again, any tendency the skip has to roll back down the cables causes the brakes to grab the cables, thereby preventing any substantial rearward movement.

If the operator is concerned about the skip running away on him during downhill travel, he can shift the toggles links 97 and the brake levers 83 into the positions shown in FIG. 7. With this arrangement, the operator has to retain the brake levers in the substantial vertical position to allow the skip to run along the line cables. If he releases the brake levers, the brakes automatically grip the line cables to stop the movement of the skip.

When the skip reaches an obstacle such as spacer 17, pulleys 112 are lifted off the upper line cables and the side frames 105 and 106 allow to swing downwardly. The adjacent safety cable 115 is disconnected from one of the adjacent safety cable 115 is disconnected from one of the side members, following which it is moved around to the opposite side of the spacer and then reconnected to said side member. Following this, hooks 60 are placed on the line cables on the side of the spacer remote from the skip, and the operator depresses pedal 62 with his foot so that the weight of the front end of the carriage is supported by the line cable through the hooks 60. The operator now grasps side bars 42, lifts the pulleys 43 off the cables, shifts them to the other side of the spacer, and then replaces them on the cables. Following this, he allows pedal 62 to swing upwardly so that hooks 60 can be moved from the line cables. When the pulleys at the back end of the skip reach th spreader, the operator repeats this operation, utilizing the hooks and shifter cables at this end.

Skip 10 of this invention is such that it can be of very light weight construction. Tubes and comparatively thin bars form the side members 24 and 25 and the side frame 105 and 106. The carriage 27 is suspended by cables 48, and the construction of the carriage is so simple that its side walls and end walls consist essentially of comparatively thin bars and braces. If the line cables extend around the curve, those on the outside of the curve are higher than those on the inside thereof. However, carriage 27 remains level at this time because of the fact that suspension cables 48 are not fixedly secured to the carriage but extend freely around rollers 56 and through tubes 50. The brakes 70 do not intefere with the desired movement of the skip, but automatically grip the line cables when the operator releases the latter and the skip tends to move in the wrong direction.

I claim:

1. A line skip for carrying men on line means including one or more cables having obstructions thereon, such as spacers and hangers, comprising:
   supporting means,
   pulley means on said supporting means and adapted to ride on and be lifted off the line means when the skip is in use,
   a carriage for carrying an operator,
   connecting means interconnecting the supporting means and the carriage to carry said carriage below the line means at such a level that said operator can grasp and work around the line means, and
   lifting means connected to the carriage operable to enable pulley means to be lifted off the line means and then replaced thereon so said lifted pulley means can be moved past an obstruction on said line means, said lifting means comprising:
   cable engager means to be placed on the line means adjacent the pulley means to be lifted,
   extensible connector means connected to and extending between the cable engager means and the carrige, and
   control means manipulatable by the operator in the carriage selectively to shorten and lengthen said connector means temporarily to take the weight of the carriage off said pulley means that is to be lifted off the line means.

2. A line skip as claimed in claim 1 in which said connecting means comprises:
   cables connected to the support means and to the carriage, and
   means for adjusting the effective length of said cables between the support and the carriage selectively to raise and lower the carriage relative to the supporting means.

3. A line skip as claimed in claim 1 in which said cable engaging means comprises a hook to engage the line means.

4. A line skip as claimed in claim 3 in which said connector means comprises a lifter cable.

5. A line skip as claimed in claim 3 in which said cable engager means comprises a pulley carried by said hook, and
   said connector means comprises a lifter cable threaded through the pulley with one end connected to the carriage and an opposite end connected to said control means.

6. A line skip as claimed in claim 1 in which said control means comprises a foot pedal mounted for movement on the carriage and connected to said connector means.

7. A line skip as claimed in claim 4 in which said control means comprises a foot pedal mounted for movement on the carriage and connected to said lifter cable.

8. A line skip as claimed in claim 5 in which said control means comprises a foot pedal mounted for movement on the carriage and connected to said opposite end of the lifter cable.

9. A line skip as claimed in claim 1 comprising:
a brake mounted on said supporting means and selectively operable to grip the line means to prevent movement of the carriage along said line means.

10. A line skip as claimed in claim 1 comprising:
a brake mounted on said support means and embracing said line means, said brake being such as to slide along the line means when the carriage moves in one direction and to grip the line means when the carriage moves in the opposite direction.

11. A line skip as claimed in claim 10 comprising:
means for said brake operable to release the brake from the line means to allow the carriage to move in said opposite direction.

12. A line skip as claimed in claim 1 in which said pulley means comprises at least one pulley on the supporting means near each end of the carriage.

13. A line skip for carrying men on line means including one or more cables having obstructions thereon, such as spacers and hangers, comprising:
a pair of laterally spaced supporting side members,
pulleys on the side members adjacent each of opposite ends thereof to ride on laterally spaced line cables,
a carriage for carrying on operator,
suspension means interconnecting the carriage and the side members to carry said carriage below the side members at such a level that said operator can grasp and work around the line cables,
lifting means connected to the carriage operable to enable the pulleys at either end of the side members to be lifted off and replaced on the line cables so the lifted pulleys can be moved past on obstruction on the line cables, said lifting means comprising:
cable engager means to be placed on the line cables adjacent the pulleys to be lifted,
extensible connector means connected to and extending between the cable engager means and the carriage, and
control means manipulatable by the operator in the carriage selectively to shorten and lengthen said connector means temporarily to take the weight of the carriage off said pulleys to be lifted off the line cables.

14. A line skip as claimed in claim 13 in which said suspension means comprises:
suspension cables connected to the side members and the carriage, and
means for adjusting the effective length of said suspension cables between the side members and the carriage selectively to raise and lower the carriage relative to the side members.

15. A line skip as claimed in claim 14 in which each of said suspension cables is movably connected to the carriage so said carriage can be maintained level when one of said line cables is higher than the other of said line cables.

16. A line skip as claimed in claim 14 in which there is one of said suspension cables at each end of the carriage, and comprising:
rollers adjacent the opposite sides of the carriage at each end thereof and around which the adjacent suspension cable extends, and
securing means for connecting the ends of said adjacent suspension cable to the side members.

17. A line skip as claimed in claim 16 in which said securing means adjustably connects the ends of said adjacent suspension cable to the side members to enable the effective length of said adjacent suspension cable between the side members and the carriage to be adjusted.

18. A line skip as claimed in claim 13 in which said cable engager means comprises a hook to engage a line cable.

19. A line skip as claimed in claim 18 in which said connector means comprises a lifter cable.

20. A line skip as claimed in claim 18 in which said cable engager means comprises a pulley carried by said hook, and
said connector means comprises a cable threaded through the pulley with one end connected to the carriage and opposite end connected to said control means.

21. A line skip as claimed in claim 13 in which said control means comprises a foot pedal mounted for movement on the carriage and connected to said connector means.

22. A line skip as claimed in claim 19 in which said control means comprises a foot pedal mounted for movement on the carriage and connected to said cable.

23. A line skip as claimed in claim 13 in which said cable engager means comprises a pair of hooks to engage the line cables, and said extensible connector means comprises a lifter cable connected to each hook and the carriage.

24. A line skip as claimed in claim 23 in which said control means comprises a depressible foot pedal mounted on the carriage, each of said lifter cables being connected to the foot pedal so that depression of the pedal lifts the carriage to transfer some of the weight thereof through the lifter cables to the line cables.

25. A line skip as claimed in claim 13 in which said cable engager means comprises a pair of hooks to engage the line cables, and a pulley carried by each hook, said control means comprises a depressible foot pedal mounted on the carriage, and said extensible connector means comprises lifter cables extending over the hook pulleys, each of said lifer cables being connected at one end of the carriage and at an opposite end to the foot pedal, whereby depression of the pedal lifts the carriage to transfer some of the weight thereof through the lifter cables to the line cables.

26. A line skip as claimed in claim 13 comprising:
a brake mounted on at least one of said side member and selectively operable to grip the adjacent line cable to prevent movement of the carriage along said line cable.

27. A line skip as claimed in claim 13 comprising:
a brake mounted on at least one of said side supports and embracing and adjacent line cable, said brake being such as to slide along the line cable when the carriage moves in one direction and to grip said line cable when the carriage moves in the opposite direction.

28. A line skip as claimed in claim 27 comprising operating means for said brake manually operable to release the brake from the line cable to allow the carriage to move in said opposite direction.

29. A line skip as claimed in claim 27 in which said brake comprises:
a lever,
a pivot pin connecting said lever to one of said side members, said lever extending upwardly from the pivot pin and by one of the line cables when the skip is in use, and
a pair of elongate and spaced brake shoes pivotally mounted on the lever, said shoes being above and below said line cable and being free of said cable when the lever is in a substantially vertical position and gripping the cable when the lever is moved to an inclined position on either side of said vertical position.

30. A line skip as claimed in claim 29 comprising:
a toggle link mounted on said pivot pin and inclined downwardly therefrom,
a toggle spring connected at one end to lever and at an opposite end to said link, said spring normally retaining the lever and the link inclined on either side of said vertical position of the lever.

31. A line skip as claimed in claim 13 comprising:
a support swingably mounted on each of said side members, each support being swingable from an upwardly extending position to a downwardly extending position, and
at least one auxiliary pulley on each of said supports positioned to ride on a line cable above the line cable on which ride the pulleys of the adjacent side member.

32. A line skip as claimed in claim 13 in which said side members are movable towards and away from each other to permit the pulleys thereof to be mounted on and removed from the line cables.

33. A line skip as claimed in claim 32 including at least one safety line extending between the side members connected to one end to one of said members and releasably connected at an opposite end to the other of said members, said safety line extending over the line cables when in operative position.

34. A line skip as claimed in claim 32 including at least one safety line extending from one of said side members downwardly and through the carriage and up to the other of said side members, the ends of said safety line being connected to their respective side members.

* * * * *